United States Patent
Clendinning et al.

(10) Patent No.: US 9,171,056 B2
(45) Date of Patent: *Oct. 27, 2015

(54) SYSTEM AND METHOD FOR RETRIEVING AND NORMALIZING PRODUCT INFORMATION

(71) Applicant: PayPal, Inc., San Jose, CA (US)

(72) Inventors: Kerry Clendinning, Austin, TX (US); Michael McCartney, Austin, TX (US); Matthew Mengerink, San Jose, CA (US); Fred Garfield Robinette, IV, Austin, TX (US); David J. Wilson, Austin, TX (US)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/306,185

(22) Filed: Jun. 16, 2014

(65) Prior Publication Data

US 2014/0304220 A1 Oct. 9, 2014

Related U.S. Application Data

(63) Continuation of application No. 13/794,055, filed on Mar. 11, 2013, now Pat. No. 8,768,937, which is a continuation of application No. 09/730,538, filed on Dec. 7, 2000, now Pat. No. 8,402,068.

(51) Int. Cl.
*G06F 17/30* (2006.01)
*G06Q 30/02* (2012.01)

(52) U.S. Cl.
CPC .... *G06F 17/30592* (2013.01); *G06F 17/30595* (2013.01); *G06Q 30/02* (2013.01)

(58) Field of Classification Search
USPC .......... 707/796, 748, 752, 791, 795, 802, 810
See application file for complete search history.

(56) References Cited

U.S. PATENT DOCUMENTS

| | | |
|---|---|---|
| 5,537,586 A | 7/1996 | Amram et al. |
| 5,740,425 A | 4/1998 | Povilus |
| 5,787,417 A | 7/1998 | Hargrove |
| 5,822,123 A | 10/1998 | Davis et al. |
| 5,844,554 A | 12/1998 | Geller et al. |
| 5,950,173 A * | 9/1999 | Perkowski .................... 705/27.1 |
| 6,029,141 A | 2/2000 | Bezos et al. |
| 6,038,560 A | 3/2000 | Wical |
| 6,044,363 A | 3/2000 | Mori et al. |

(Continued)

FOREIGN PATENT DOCUMENTS

| | | |
|---|---|---|
| WO | WO-2006107333 A1 | 10/2006 |
| WO | WO-2006107335 A1 | 10/2006 |

OTHER PUBLICATIONS

"U.S. Appl. No. 11/241,801, Final Office Action mailed Mar. 12, 2015", 12 pgs.

(Continued)

*Primary Examiner* — Sana Al Hashemi
(74) *Attorney, Agent, or Firm* — Schwegman Lundberg & Woessner, P.A.

(57) ABSTRACT

A system and method for retrieving and normalizing product information is described. The system may collect product information from suppliers. The product information may relate to a product that is described differently by two or more of suppliers. The system may further provide a normalized representation of the product.

20 Claims, 12 Drawing Sheets

(56) References Cited

U.S. PATENT DOCUMENTS

| | | | |
|---|---|---|---|
| 6,119,101 A * | 9/2000 | Peckover | 705/7.31 |
| 6,122,648 A * | 9/2000 | Roderick | 715/207 |
| 6,144,958 A | 11/2000 | Ortega et al. | |
| 6,151,601 A * | 11/2000 | Papierniak et al. | 1/1 |
| 6,216,264 B1 | 4/2001 | Maze et al. | |
| 6,230,156 B1 | 5/2001 | Hussey | |
| 6,266,649 B1 | 7/2001 | Linden et al. | |
| 6,385,602 B1 | 5/2002 | Tso et al. | |
| 6,401,084 B1 | 6/2002 | Ortega et al. | |
| 6,453,312 B1 | 9/2002 | Goiffon et al. | |
| 6,460,058 B2 | 10/2002 | Koppolu et al. | |
| 6,476,833 B1 | 11/2002 | Moshfeghi | |
| 6,490,567 B1 | 12/2002 | Gregory | |
| 6,510,434 B1 | 1/2003 | Anderson et al. | |
| 6,598,026 B1 | 7/2003 | Ojha et al. | |
| 6,606,619 B2 | 8/2003 | Ortega et al. | |
| 6,631,522 B1 | 10/2003 | Erdelyi | |
| 6,633,316 B1 | 10/2003 | Maddalozzo et al. | |
| 6,647,383 B1 | 11/2003 | August et al. | |
| 6,667,751 B1 | 12/2003 | Wynn et al. | |
| 6,697,800 B1 | 2/2004 | Jannink et al. | |
| 6,697,823 B2 | 2/2004 | Otsuka et al. | |
| 6,697,824 B1 | 2/2004 | Bowman-Amuah | |
| 6,727,927 B1 | 4/2004 | Dempski et al. | |
| 6,785,671 B1 | 8/2004 | Bailey et al. | |
| 6,820,111 B1 | 11/2004 | Rubin et al. | |
| 6,853,982 B2 | 2/2005 | Smith et al. | |
| 6,907,574 B2 | 6/2005 | Xu et al. | |
| 6,928,425 B2 | 8/2005 | Grefenstette et al. | |
| 6,963,867 B2 | 11/2005 | Ford et al. | |
| 6,978,264 B1 | 12/2005 | Chandrasekar et al. | |
| 6,978,445 B2 | 12/2005 | Laane | |
| 6,990,534 B2 | 1/2006 | Mikhailov et al. | |
| 7,013,423 B2 | 3/2006 | Blaschke et al. | |
| 7,085,736 B2 | 8/2006 | Keezer et al. | |
| 7,114,128 B2 | 9/2006 | Koppolu et al. | |
| 7,228,298 B1 | 6/2007 | Raines | |
| 7,295,995 B1 | 11/2007 | York et al. | |
| 7,430,739 B2 | 9/2008 | Vellanki et al. | |
| 7,480,872 B1 | 1/2009 | Ubillos | |
| 7,536,672 B1 | 5/2009 | Ruehle | |
| 7,685,074 B2 | 3/2010 | Linden et al. | |
| 7,882,447 B2 | 2/2011 | Chandler et al. | |
| 8,126,907 B2 | 2/2012 | Knighton et al. | |
| 8,402,068 B2 | 3/2013 | Clendinning et al. | |
| 8,768,937 B2 | 7/2014 | Clendinning et al. | |
| 8,819,039 B2 | 8/2014 | Grove et al. | |
| 8,849,693 B1 | 9/2014 | Koyfman et al. | |
| 8,863,002 B2 | 10/2014 | Chandler et al. | |
| 2002/0026353 A1 | 2/2002 | Porat et al. | |
| 2002/0082893 A1 | 6/2002 | Barts et al. | |
| 2002/0083448 A1 | 6/2002 | Johnson | |
| 2002/0123912 A1 | 9/2002 | Subramanian et al. | |
| 2002/0135567 A1 | 9/2002 | Chan | |
| 2002/0154157 A1 | 10/2002 | Sherr et al. | |
| 2003/0020449 A1 | 1/2003 | Smith | |
| 2003/0025737 A1 | 2/2003 | Breinberg | |
| 2003/0036964 A1 | 2/2003 | Boyden et al. | |
| 2003/0061147 A1 | 3/2003 | Fluhr et al. | |
| 2003/0066031 A1 | 4/2003 | Laane | |
| 2003/0083961 A1 | 5/2003 | Bezos et al. | |
| 2003/0105682 A1 | 6/2003 | Dicker et al. | |
| 2003/0195877 A1 | 10/2003 | Ford et al. | |
| 2003/0200156 A1 | 10/2003 | Roseman et al. | |
| 2003/0204449 A1 | 10/2003 | Kotas et al. | |
| 2003/0216971 A1 | 11/2003 | Sick et al. | |
| 2004/0001104 A1 | 1/2004 | Sommerer et al. | |
| 2004/0078457 A1 | 4/2004 | Tindal | |
| 2004/0083206 A1 | 4/2004 | Wu et al. | |
| 2004/0153378 A1 | 8/2004 | Perkowski | |
| 2004/0243478 A1 | 12/2004 | Walker et al. | |
| 2004/0260677 A1 | 12/2004 | Malpani et al. | |
| 2005/0010871 A1 | 1/2005 | Ruthfield et al. | |
| 2005/0114682 A1 | 5/2005 | Zimmer et al. | |
| 2005/0114782 A1 | 5/2005 | Klinger | |
| 2005/0132297 A1 | 6/2005 | Milic-Frayling et al. | |
| 2005/0197141 A1 | 9/2005 | Jiang et al. | |
| 2005/0204292 A1 | 9/2005 | Kibilov et al. | |
| 2005/0257131 A1 | 11/2005 | Lim et al. | |
| 2006/0059440 A1 | 3/2006 | Pry | |
| 2006/0224406 A1 | 10/2006 | Leon et al. | |
| 2006/0224571 A1 | 10/2006 | Leon et al. | |
| 2006/0224954 A1 | 10/2006 | Chandler et al. | |
| 2006/0224960 A1 | 10/2006 | Baird-Smith | |
| 2007/0255810 A1 | 11/2007 | Shuster | |
| 2011/0093494 A1 | 4/2011 | Chandler et al. | |
| 2013/0198183 A1 | 8/2013 | Clendinning et al. | |
| 2014/0372244 A1 | 12/2014 | Grove et al. | |
| 2015/0020017 A1 | 1/2015 | Chandler et al. | |

OTHER PUBLICATIONS

"U.S. Appl. No. 11/241,824, Corrected Notice of Allowance mailed May 7, 2015", 6 pgs.

"U.S. Appl. No. 11/241,824, Notice of Allowance mailed Mar. 30, 2015", 5 pgs.

"U.S. Appl. No. 11/241,883, Response filed Jan 26, 2015 to Non Final Office Action mailed Sep. 24, 2014", 21 pgs.

"U.S. Appl. No. 14/318,525, Non Final Office Action mailed Feb. 12, 2015", 19 pgs.

"U.S. Appl. No. 09/730,538, Advisory Action mailed May 9, 2007", 3 pgs.

"U.S. Appl. No. 09/730,538, Advisory Action mailed Aug. 7, 2007", 3 pgs.

"U.S. Appl. No. 09/730,538, Advisory Action mailed Dec. 23, 2003", 2 pgs.

"U.S. Appl. No. 09/730,538, Amendment filed Sep. 20, 2012", 16 pgs.

"U.S. Appl. No. 09/730,538, Amendment Under 37 CFR 41.33 mailed Jul. 30, 2007", 8 pgs.

"U.S. Appl. No. 09/730,538, Appeal Brief filed Jan. 14, 2008", 17 pgs.

"U.S. Appl. No. 09/730,538, Appeal Brief filed Aug. 2, 2007", 30 pgs.

"U.S. Appl. No. 09/730,538, Decision on Appeal mailed Jul. 20, 2012", 6 pgs.

"U.S. Appl. No. 09/730,538, Examiner's Answer mailed Jun. 23, 2009", 9 pgs.

"U.S. Appl. No. 09/730,538, Examiner's Answer mailed Jul. 21, 2009", 9 pgs.

"U.S. Appl. No. 09/730,538, Final Office Action mailed Feb. 28, 2007", 8 pgs.

"U.S. Appl. No. 09/730,538, Final Office Action mailed Apr. 3, 2006", 9 pgs.

"U.S. Appl. No. 09/730,538, Final Office Action mailed Aug. 11, 2003", 7 pgs.

"U.S. Appl. No. 09/730,538, Final Office Action mailed Dec. 7, 2004", 8 pgs.

"U.S. Appl. No. 09/730,538, Non Final Office Action mailed Feb. 6, 2004", 7 pgs.

"U.S. Appl. No. 09/730,538, Non Final Office Action mailed May 5, 2005", 8 pgs.

"U.S. Appl. No. 09/730,538, Non Final Office Action mailed Sep. 19, 2006", 8 pgs.

"U.S. Appl. No. 09/730,538, Non-Final Office Action mailed Feb. 27, 2003", 6 pgs.

"U.S. Appl. No. 09/730,538, Notice of Allowance mailed Nov. 5, 2012", 16 pgs.

"U.S. Appl. No. 09/730,538, Pre-Appeal Brief Request filed May 29, 2007", 5 pgs.

U.S. Appl. No. 09/730,538, Response filed Jan. 17, 2006 to Non-Final Office Action mailed May 4, 2005, 19 pgs.

"U.S. Appl. No. 09/730,538, Response filed Mar, 7, 2005 to Final Office Action mailed Dec. 7, 2004", 19 pgs.

"U.S. Appl. No. 09/730,538, Response filed Apr. 30, 2007 to Final Office Action mailed Feb. 28, 2007", 18 pgs.

"U.S. Appl. No. 09/730,538, Response filed May 27, 2003 to Non Final Office Action mailed Feb. 27, 2003", 11 pgs.

"U.S. Appl. No. 09/730,538, Response filed May 28, 2004 to Non-Final Office Action mailed Feb. 6, 2004", 17 pgs.

(56) References Cited

OTHER PUBLICATIONS

"U.S. Appl. No. 09/730,538, Response filed Jul. 3, 2006 to Final Office Action mailed Apr. 3, 2006", 17 pgs.
"U.S. Appl. No. 09/730,538, Response filed Aug. 1, 2005 to Non Final Office Action mailed May 4, 2005", 16 pgs.
"U.S. Appl. No. 09/730,538, Response filed Nov. 25, 2003 to Final Office Action mailed Aug. 11, 2003", 19 pgs.
"U.S. Appl. No. 09/730,538, Response filed Nov. 30, 2006 to Non Final Office Action mailed Sep. 19, 2006", 14 pgs.
"U.S. Appl. No. 09/730,538, Response to Notice of Non-Compliant Appeal Brief filed Jan. 14, 2008", 17 pgs.
"U.S. Appl. No. 10/648,125, Advisory Action mailed Feb. 11, 2009", 3 pgs.
"U.S. Appl. No. 10/648,125, Advisory Action mailed Jun. 9, 2005", 4 pgs.
"U.S. Appl. No. 10/648,125, Appeal Brief filed Jul. 16, 2010", 35 pgs.
"U.S. Appl. No. 10/648,125, Appeal Decision mailed Jan. 30, 2014", 12 pgs.
"U.S. Appl. No. 10/648,125, Decision on Pre-Appeal Brief Request mailed Apr. 16, 2010", 2 pgs.
"U.S. Appl. No. 10/648,125, Examiner Interview Summary filed Jun. 12, 2014", 1 pg.
"U.S. Appl. No. 10/648,125, Examiner Interview Summary mailed Jan. 6, 2006", 3 pgs.
"U.S. Appl. No. 10/648,125, Examiner Interview Summary mailed Mar. 28, 2014", 2 pgs.
"U.S. Appl. No. 10/648,125, Examiner Interview Summary mailed Oct. 16, 2008", 2 pgs.
"U.S. Appl. No. 10/648,125, Examiner's Answer to Appeal Brief mailed Oct. 14, 2010", 47 pgs.
"U.S. Appl. No. 10/648,125, Final Office Action mailed Jan. 4, 2010", 39 pgs.
"U.S. Appl. No. 10/648,125, Final Office Action mailed Jan. 9, 2006", 29 pgs.
"U.S. Appl. No. 10/648,125, Final Office Action mailed Mar. 24, 2005", 19 pgs.
"U.S. Appl. No. 10/648,125, Final Office Action mailed Jul. 24, 2007", 27 pgs.
"U.S. Appl. No. 10/648,125, Final Office Action mailed Oct. 10, 2008", 56 pgs.
"U.S. Appl. No. 10/648,125, Final Office Action mailed Dec. 4, 2004-08", 33 pgs.
"U.S. Appl. No. 10/648,125, Non Final Office Action mailed Feb. 21, 2008", 53 pgs.
"U.S. Appl. No. 10/648,125, Non Final Office Action mailed May 13, 2009", 36 pgs.
"U.S. Appl. No. 10/648,125, Non Final Office Action mailed Aug. 25, 2005", 14 pgs.
"U.S. Appl. No. 10/648,125, Non Final Office Action mailed Sep. 1, 2004", 22 pgs.
"U.S. Appl. No. 10/648,125, Non Final Office Action mailed Dec. 7, 2006", 27 pgs.
"U.S. Appl. No. 10/648,125, Notice of Allowance mailed Apr. 21, 2014", 14 pgs.
"U.S. Appl. No. 10/648,125, Pre-Appeal Brief Request mailed Mar. 4, 2010", 5 pgs.
"U.S. Appl. No. 10/648,125, Reply Brief filed Mar. 26, 2014", 65 pgs.
"U.S. Appl. No. 10/648,125, Reply Brief filed Nov. 2, 2010", 10 pgs.
"U.S. Appl. No. 10/648,125, Response filed Jan. 3, 2005 to Non Final Office Action mailed Sep. 1, 2004", 18 pgs.
"U.S. Appl. No. 10/648,125, Response filed Feb. 4, 2009 to Final Office Action mailed Dec 4, 2008", 13 pgs.
"U.S. Appl. No. 10/648,125, Response filed Mar. 4, 2009 to Final Office Action mailed Dec. 4, 2008", 14 pgs.
"U.S. Appl. No. 10/648,125, Response filed May 7, 2007 to Non Final Office Action mailed Dec. 7, 2006", 14 pgs.
"U.S. Appl. No. 10/648,125, Response filed May 24, 2005 to Final Office Action mailed Mar. 24, 2005", 21 pgs.
"U.S. Appl. No. 10/648,125, Response filed Jun. 23, 2008 to Non Final Office Action mailed Feb. 21, 2008", 19 pgs.
"U.S. Appl. No. 10/648,125, Response filed Jul. 10, 2006 to Final Office Action mailed Jan. 9, 2006", 14 pgs.
"U.S. Appl. No. 10/648,125, Response filed Jul. 25. 2005 to Advisory Action mailed Jun. 9, 2005", 9 pgs.
"U.S. Appl. No. 10/648,125, Response filed Sep. 14, 2009 to Non Final Office Action mailed May 13, 2009", 14 pgs.
"U.S. Appl. No. 10/648,125, Response filed Oct. 30, 2007 to Final Office Action mailed Jul. 24, 2007", 13 pgs.
"U.S. Appl. No. 10/648,125, Response filed Dec. 16, 2005 to Non Final Office Action mailed Aug. 25, 2005", 9 pgs.
"U.S. Appl. No. 11/241,766, 312 Amendment mailed Nov. 30, 2010", 6 pgs.
"U.S. Appl. No. 11/241,766, Advisory Action mailed Feb. 19, 2010", 3 pgs.
"U.S. Appl. No. 11/241,766, Advisory Action mailed Nov. 6, 2008", 3 pgs.
"U.S. Appl. No. 11/241,766, Decision on Pre-Appeal Brief mailed May 4, 2010", 2 pgs.
"U.S. Appl. No. 11/241,766, Decision on Pre-Appeal Brief Request mailed Dec. 5, 2008", 2 pgs.
"U.S. Appl. No. 11/241,766, Final Office Action mailed Aug. 12, 2008", 10 pgs.
"U.S. Appl. No. 11/241,766, Final Office Action mailed Dec. 4, 2009", 10 pgs.
"U.S. Appl. No. 11/241,766, Non-Final Office Action mailed Jan. 14, 2008", 7 pgs.
"U.S. Appl. No. 11/241,766, Non-Final Office Action mailed Apr. 2, 2009", 9 pgs.
"U.S. Appl. No. 11/241,766, Notice of Allowance mailed Aug. 31, 2010", 12 pgs.
"U.S. Appl. No. 11/241,766, Pre-Appeal Brief Request filed Nov. 12, 2008", 5 pgs.
"U.S. Appl. No. 11/241,766, Pre-Appeal Brief Request mailed Mar. 4, 2010", 5 pgs.
"U.S. Appl. No. 11/241,766, PTO Response to 312 Amendment mailed Jan. 5, 2011", 2 pgs.
"U.S. Appl. No. 11/241,766, Response filed Jan. 26, 2009 to Final Office Action mailed Aug. 12, 2008", 12 pgs.
"U.S. Appl. No. 11/241,766, Response filed Feb. 4, 2010 to Final Office Action mailed Dec. 4, 2010", 16 pgs.
"U.S. Appl. No. 11/241,766, Response filed Apr. 14, 2008 to Non-Final Office Action mailed Jan. 14, 2008", 13 pgs.
"U.S. Appl. No. 11/241,766, Response filed Aug. 3, 2009 to Non Final Office Action mailed Apr. 2, 2009", 13 pgs.
"U.S. Appl. No. 11/241,766, Response filed Oct. 16, 2008 to Final Office Action mailed Aug. 12, 2008", 14 pgs.
"U.S. Appl. No. 11/241,801, Advisory Action mailed Aug. 2, 2012", 3 pgs.
"U.S. Appl. No. 11/241,801, Examiner Interview Summary mailed Oct. 28, 2014", 3 pgs.
"U.S. Appl. No. 11/241,801, Final Office Action mailed Jan. 6, 2011", 10 pgs.
"U.S. Appl. No. 11/241,801, Final Office Action mailed Apr. 20, 2012", 12 pgs.
"U.S. Appl. No. 11/241,801, Final Office Action mailed Aug. 2, 2013", 14 pgs.
"U.S. Appl. No. 11/241,801, Final Office Action mailed Dec. 13, 2012", 11 pgs.
"U.S. Appl. No. 11/241,801, Final Office Action mailed Dec. 29, 2009", 12 pgs.
"U.S. Appl. No. 11/241,801, Non Final Office Action mailed Sep. 9, 2014", 12 pgs.
"U.S. Appl. No. 11/241,801, Non Final Office Action mailed Nov. 4, 2011", 9 pgs.
"U.S. Appl. No. 11/241,801, Non Final Office Action mailed Dec. 19, 2013", 11 pgs.
"U.S. Appl. No. 11/241,801, Non-Final Office Action mailed Jun. 12, 2009", 17 pgs.
"U.S. Appl. No. 11/241,801, Non-Final Office Action mailed Jul. 22, 2010", 9 pgs.
"U.S. Appl. No. 11/241,801, Response filed Feb. 6, 2012 to Non Final Office Action mailed Nov. 4, 2011", 13 pgs.

(56) References Cited

OTHER PUBLICATIONS

"U.S. Appl. No. 11/241,801, Response filed Mar. 7, 2011 to Final Office Action mailed Jan. 6, 2011", 14 pgs.
"U.S. Appl. No. 11/241,801, Response filed Apr. 13, 2009 to Restriction Requirement mailed Mar. 13, 2009", 8 pgs.
"U.S. Appl. No. 11/241,801, Response filed Apr. 15, 2013 to Final Office Action mailed Dec. 13, 2012", 15 pgs.
"U.S. Appl. No. 11/241,801, Response filed Apr. 21, 2014 to Non Final Office Action mailed Dec. 19, 2013", 15 pgs.
"U.S. Appl. No. 11/241,801, Response filed Apr. 29, 2010 to Final Office Action mailed Dec. 29, 2009", 15 pgs.
"U.S. Appl. No. 11/241,801, Response filed Jun. 20, 2012 to Non Final Office Action mailed Apr. 20, 2012", 15 pgs.
"U.S. Appl. No. 11/241,801, Response filed Sep. 11, 2009 to Non Final Office Action mailed Jun. 12, 2009", 10 pgs.
"U.S. Appl. No. 11/241,801, Response filed Oct. 2, 2013 to Final Office Action mailed Aug. 2, 2013", 14 pgs.
"U.S. Appl. No. 11/241,801, Response filed Oct. 21, 2010 to Non Final Office Action mailed Jul. 22, 2010", 13 pgs.
"U.S. Appl. No. 11/241,801, Response filed Nov. 10, 2014 to Non Final Office Action mailed Sep. 9, 2014", 26 pgs.
"U.S. Appl. No. 11/241,801, Restriction Requirement mailed Mar. 13, 2009", 6 pgs.
"U.S. Appl. No. 11/241,824, Advisory Action mailed Feb. 26, 2013", 4 pgs.
"U.S. Appl. No. 11/241,824, Advisory Action mailed Mar. 17, 2009", 3 pgs.
"U.S. Appl. No. 11/241,824, Decision on Pre-Appeal Brief Request mailed May 31, 2013", 2 pgs.
"U.S. Appl. No. 11/241,824, Examiner Interview Summary mailed Nov. 6, 2014", 3 pgs.
"U.S. Appl. No. 11/241,824, Final Office Action mailed Apr. 15, 2008", 19 pgs.
"U.S. Appl. No. 11/241,824, Final Office Action mailed Oct. 26, 2012", 12 pgs.
"U.S. Appl. No. 11/241,824, Final Office Action mailed Dec. 26, 2008", 11 pgs.
"U.S. Appl. No. 11/241,824, Final Office Action mailed Dec. 29, 2009", 13 pgs.
"U.S. Appl. No. 11/241,824, Non Final Office Action mailed Mar. 29, 2012", 10 pgs.
"U.S. Appl. No. 11/241,824, Non Final Office Action mailed Jun. 20, 2014", 13 pgs.
"U.S. Appl. No. 11/241,824, Non-Final Office Action mailed Jun. 12, 2009", 14 pgs.
"U.S. Appl. No. 11/241,824, Non-Final Office Action mailed Jul. 10, 2008", 9 pgs.
"U.S. Appl. No. 11/241,824, Non-Final Office Action mailed Oct. 31, 2007", 17 pgs.
"U.S. Appl. No. 11/241,824, Pre-Appeal Brief Request filed Mar. 26, 2013", 5 pgs.
"U.S. Appl. No. 11/241,824, Response filed Jan. 3, 2013 to Final Office Action mailed Oct. 26, 2012", 16 pgs.
"U.S. Appl. No. 11/241,824, Response filed Feb. 26, 2009 to Final Office Action mailed Dec. 26, 2008", 13 pgs.
"U.S. Appl. No. 11/241,824, Response filed Feb. 29, 2008 to Non-Final Office Action mailed Oct. 31, 2007", 23 pgs.
"U.S. Appl. No. 11/241,824, Response filed Mar. 1, 2010 to Final Office Action mailed Dec. 29, 2009", 13 pgs.
"U.S. Appl. No. 11/241,824, Response filed Jun. 16, 2008 to Final Office Action mailed Apr. 15, 2008", 15 pgs.
"U.S. Appl. No. 11/241,824, Response filed Jul. 30, 2012 to Non Final Office Action mailed Mar. 29, 2012", 14 pgs.
"U.S. Appl. No. 11/241,824, Response filed Jul. 31, 2013 to Final Office Action mailed Oct. 26, 2012", 21 pgs.
"U.S. Appl. No. 11/241,824, Response filed Sep. 11, 2009 to Non Final Office Action mailed Jun. 12, 2009", 16 pgs.
"U.S. Appl. No. 11/241,824, Response filed Oct. 1, 2008 to Non-Final Office Action mailed Jul. 10, 2008", 13 pgs.
"U.S. Appl. No. 11/241,824, Response filed Nov. 20, 2014 to Non Final Office Action mailed Jun. 20, 2014", 18 pgs.
"U.S. Appl. No. 11/241,883, Advisory Action mailed Mar. 12, 2014", 3 pgs.
"U.S. Appl. No. 11/241,883, Advisory Action mailed Mar. 17, 2010", 3 pgs.
"U.S. Appl. No. 11/241,883, Amendment filed Aug. 15, 2015-12", 10 pgs.
"U.S. Appl. No. 11/241,883, Appeal Brief filed May 24, 2010", 24 pgs.
"U.S. Appl. No. 11/241,883, Decision on Appeal mailed Jun. 15, 2012", 5 pgs.
"U.S. Appl. No. 11/241,883, Decision on Pre-Appeal Brief Request mailed Apr. 6, 2010", 2 pgs.
"U.S. Appl. No. 11/241,883, Examiner Interview Summary mailed Mar. 12, 2014", 3 pgs.
"U.S. Appl. No. 11/241,883, Examiner's Answer to Appeal Brief mailed Aug. 4, 2010", 10 pgs.
"U.S. Appl. No. 11/241,883, Final Office Action mailed Dec. 16, 2013", 12 pgs.
"U.S. Appl. No. 11/241,883, Final Office Action mailed Dec. 22, 2009", 9 pgs.
"U.S. Appl. No. 11/241,883, Non Final Office Action mailed Jun. 22, 2009", 13 pgs.
"U.S. Appl. No. 11/241,883, Non Final Office Action mailed Sep. 24, 2014", 13 pgs.
"U.S. Appl. No. 11/241,883, Pre-Appeal Brief Request mailed Mar. 22, 2010", 5 pgs.
"U.S. Appl. No. 11/241,883, Reply Brief filed Sep. 30, 2010", 6 pgs.
"U.S. Appl. No. 11/241,883, Response filed Feb. 18, 2014 to Final Office Action mailed Dec. 16, 2013", 11 pgs.
"U.S. Appl. No. 11/241,883, Response filed Feb. 22, 2010 to Final Office Action mailed Dec. 22, 2009", 11 pgs.
"U.S. Appl. No. 11/241,883, Response filed Mar. 18, 2014 to Final Office Action mailed Dec. 16, 2013", 11 pgs.
"U.S. Appl. No. 11/241,883, Response filed Sep. 22, 2009 to Non Final Office Action mailed Jun. 22, 2009", 11 pgs.
"U.S. Appl. No. 12/897,587, Non Final Office Action mailed May 30, 2013", 10 pgs.
"U.S. Appl. No. 12/897,587, Notice of Allowance mailed May 16, 2014", 14 pgs.
"U.S. Appl. No. 12/897,587, Preliminary Amendment filed Oct. 4, 2010", 3 pgs.
"U.S. Appl. No. 12/897,587, Response filed Aug. 30, 2013 to Non Final Office Action mailed May 30, 2013", 11 pgs.
"U.S. Appl. No. 13/794,055, Final Office Action mailed Sep. 5, 2013", 6 pgs.
"U.S. Appl. No. 13/794,055, Non Final Office Action mailed Jun. 25, 2013", 6 pgs.
"U.S. Appl. No. 13/794,055, Notice of Allowance mailed Feb. 20, 2014", 6 pgs.
"U.S. Appl. No. 13/794,055, Response filed Feb. 5, 2014 to Final Office Action mailed Sep. 5, 2013", 6 pgs.
"U.S. Appl. No. 13/794,055, Response filed Aug. 27, 2013 to Non Final Office Action mailed Jun. 25, 2013", 7 pgs.
"U.S. Appl. No. 14/318,525, Preliminary Amendment filed Jun. 30, 2014", 8 pgs.
"U.S. Appl. No. 14/318,525, Supplemental Preliminary Amendment filed Aug. 14, 2014", 3 pgs.
"U.S. Appl. No. 14/500,884, Preliminary Amendment filed Oct. 20, 2014", 6 pgs.
"Australian Application Serial No. 2005330296, Response filed Nov. 30, 2009 to Office Action mailed Apr. 2, 2009", 12 pgs.
"Australian Application Serial No. 2005330296, Search Report mailed Apr. 2, 2009", 2 pgs.
"Australian Application Serial No. 2010201697, Notice of Acceptance mailed May 7, 2012", 4 pgs.
"Australian Application Serial No. 2010201697, Office Action mailed Feb. 27, 2012", 2 pgs.
"Australian Application Serial No. 2010201697, Response filed Jan. 31, 2012 to Examiner Report mailed Mar. 21, 2011", 24 pgs.
"Australian Application Serial No. 2010201697, Response filed Apr. 19, 2012 to Office Action mailed Feb. 27, 2012", 13 pgs.

(56) References Cited

OTHER PUBLICATIONS

"Australian Application Serial No. 2012216254, First Examination Report mailed Jan. 25, 2013", 3 pgs.
"Australian Application Serial No. 2012216254, Response filed Jan. 6, 2014 to Subsequent Examiners Report mailed Sep. 27, 2013", 13 pgs.
"Australian Application Serial No. 2012216254, Response to Examination Report filed Aug. 28, 2013", 3 pgs.
"Australian Application Serial No. 2012216254, Subsequent Examiners Report mailed Feb. 3, 2014", 3 pgs.
"Australian Application Serial No. 2012216254, Subsequent Examiners Report mailed Sep. 27, 2013", 3 pgs.
"Australian Application Serial No. 2010201697, First Examiner Report mailed Mar. 21, 2011", 2 Pgs.
"Chinese Application Serial No. 200580049965.9, Office Action mailed Apr. 25, 2013", with English translation of claims, 18 pgs.
"Chinese Application Serial No. 200580049965.9, Office Action mailed Aug. 2, 2013", with English translation of claims, 18 pgs.
"Chinese Application Serial No. 200580049965.9, Office Action mailed Aug. 7, 2012", with English translation of claims, 9 pgs.
"Chinese Application Serial No. 200580049965.9, Office Action mailed Sep. 18, 2009", with English translation of claims, 26 pgs.
"Chinese Application Serial No. 200580049965.9, Office Action mailed Dec. 5, 2011", w/ English Translation, 19 pgs.
"Chinese Application Serial No. 200580049965.9, Reexamination Decision mailed Jan. 15, 2013", with English translation, 2 pgs.
"Chinese Application Serial No. 200580049965.9, Response filed Jan. 28, 2010", with English translation of claims, 31 pgs.
"Chinese Application Serial No. 200580049965.9, Response filed Oct. 10, 2012 to Office Action mailed Aug. 7, 208-7-12", with English translation of claims, 47 pgs.
"Chinese Application Serial No. 2005800499659, Response filed Feb. 16, 2012 to Office Action mailed Dec. 5, 2011", with English translation of claims, 17 pgs.
"European Application Serial No. 05802369.8 Office Action Mailed Dec. 22, 2009", 4 pgs.
"European Application Serial No. 05802369.8, Response to Summons filed Dec. 12, 2013", 11 pgs.
"European Application Serial No. 05802369.8, Office Action mailed Jan. 13, 2014", 2 pgs.
"European Application Serial No. 05802369.8, Office Action mailed Feb. 14, 2014", 15 pgs.
"European Application Serial No. 05802369.8, Office Action mailed Feb. 20, 2014", 10 pgs.
"European Application Serial No. 05802369.8, Office Action mailed Oct. 23, 2012", 5 pgs.
"European Application Serial No. 05802369.8, Office Action mailed Dec. 6, 2011", 7 pgs.
"European Application Serial No. 05802369.8, Response filed Feb. 22, 2013 to Examination Notification Art 94(3) mailed Oct. 23, 2012", 10 pgs.
"European Application Serial No. 05802369.8, Response filed Oct. 8, 2010", 4 pgs.
"European Application Serial No. 05802369.8, Search Report mailed Dec. 22, 2009", 3 pgs.
"European Application Serial No. 05802369.8, Summons to Attend Oral Proceedings mailed Sep. 20, 2013", 5 pgs.
"European Application Serial No. 11195425.1, Extended European Search Report mailed Mar. 27, 2012", 6 pgs.
"European Application Serial No. 11195425.1, Office Action mailed Feb. 10, 2014", 5 pgs.
"European Application Serial No. 11195425.1, Response filed Oct. 24, 2012 to Extended Search Report mailed Mar. 27, 2012", 18 pgs.
"European Application Serial No. 11195437.6, Extended Search Report mailed Jun. 12, 2012", 5 pgs.
"European Application Serial No. 11195437.6, Response filed Jan. 21, 2013 to Extended European Search Report mailed Jun. 12, 2012", 10 pgs.
"Flamenco Search Interface Project", [Online]. Retrieved from the Internet: <URL: http://flamenco.berkeley.edy/pubs.html>, (Oct. 2008), 2 pgs.
"Indian Application Serial No. 7927/DELNP/2007, First Examination Report mailed Nov. 8, 2013", 2 pgs.
"International Application No. PCT/US05/35543, International Search Report mailed Mar. 16, 2006", 11 pgs.
"International Application Serial No. PCT/US03/41543, International Preliminary Report mailed Arp. 27, 2005", 6 pgs.
"International Application Serial No. PCT/US03/41543, International Search Report mailed Apr. 14, 2004", 7 pgs.
"International Application Serial No. PCT/US03/41543, Written Opinion mailed Aug. 26, 2004", 9 pgs.
"International Application Serial No. PCT/US05/35308, International Search Report and Written Opinion mailed Apr. 18, 2006", 8 pgs.
"International Application Serial No. PCT/US05/35543, International Search Report and Written Opinion mailed Mar. 16, 2006", 10 pgs.
"International Application Serial No. PCT/US2005/035308, International Preliminary Report on Patentability mailed Oct. 11, 2007", 5 pgs.
"International Application Serial No. PCT/US2005/035543, International Preliminary Report on Patentability mailed Oct. 11, 2007", 5 pgs.
"International Application Serial No. PCT/US05/35308, International Search Report and Written Opinion mailed Apr. 18, 2006", 8 Pages.
"Internet Explorer Screen Dumps", Microsoft.com,version 6.0 SP2, (Dec. 2004), 1-6.
"Korean Application Serial No. 2007-7025209, Office Action mailed Jun. 2, 2009", English translation, 6 pgs.
"Korean Application Serial No. 2007-7025209, Office Action Mailed Dec. 8, 2008", with English translation of claims, 8 pgs.
"Korean Application Serial No. 2007-7025209, Office Action mailed Dec. 2, 2009", with English translation of claims, 6 pgs.
"Korean Application Serial No. 2007-7025209, Response filed Feb. 2, 2010", with English translation of claims, 22 pgs.
"Korean Application Serial No. 2007-7025209, Response filed Aug. 3, 2009", with English translation of claims, 48 pgs.
"Korean Application Serial No. 2009-7016255, Office Action mailed Nov. 3, 2009", with English translation of claims, 6 pgs.
"Korean Application Serial No. 2009-7016255, Response filed Jan. 4, 2010", with English translation of claims, 20 pgs.
Cai, Yiping, et al., "Study on Classification of Product Data in Electronic Business Market", Journal of Hangzhou Electronic Industry College, vol. 23, No. 4, with English abstract., (Aug. 2003), 4 pgs.
Cohen, E. S, et al., "Automatic strategies in the Siemens RRL tiled window manager", Proceedings of the 2nd IEEE Conference on Computer Workstations, (1988), 111-119.
English, Jennifer, et al., "Examining the Usability of Web Site Search", [Online]. Retrieved from the Internet: <URL: http://citeseer.ist.psu.edu/viewdoc/download?doi=10.1.1.137.9092&rep=rep1&type=pdf>, (Retrieved Mar. 7, 2011), 10 pgs.
English, Jennifer, et al., "Hierarchical Faceted Metadata in Site Search Interfaces", CHI 2002, [Online]. Retrieved from the Internet: <http://flamenco.berkeley.edu/papers/chi02_short_paper.pdf>, (Feb. 9, 2012), 2 pgs.
Hearst, Marti, et al., "Finding the FL Site Sear", Communications of the ACM 45(9), (Sep. 2002), 42-49.
Kandogan, Eser, et al., "Elastic Windows: Improved Spatial Layout and Rapid Multiple Window Operations", Proceedings of the Workshop on Advanced Visual Interfaces AVI, XX, XX, (Jan. 1, 1996), 29-38.
Kotas, Paul, et al., "Use of Electronic Catalog to Facilitate User-to-User Sales", U.S. Appl. No. 60/336,409, filed Oct. 31, 2001, 48 pgs.

* cited by examiner

|       | PRODUCT IDs   | CORE PRODUCT IDs |       |
|-------|---------------|------------------|-------|
| 2001— | PRODUCT ID #1 | 789              | —2002 |
|       | PRODUCT ID #2 | 790              |       |
|       | PRODUCT ID #3 | 788              |       |
| 2000— | ⋮             | ⋮                |       |
|       | PRODUCT ID #N | 790              |       |

FIG.2

| 3001    | 3002   | 3003   | 3004   | ⋯ | 3005   |
|---------|--------|--------|--------|---|--------|
| CORE ID | DOMAIN | ATTR 1 | ATTR 2 | ⋯ | ATTR N |
| 789     | LAPTOP | CPU    | DISP   |   | MEM    |
|         |        |        |        |   |        |
|         |        |        |        |   |        |
| ⋮       | ⋮      | ⋮      | ⋮      |   | ⋮      |
|         |        |        |        |   |        |

VENDOR INFORMATION

70 — NAME:

71 — ADDRESS: STREET
              CITY, STATE

72 — TELEPHONE: (XXX)XXX-XXXX

73 — SHIPS: AIR OR GROUND MAIL

74 — ACCEPTED PAYMENT: CASH, CREDIT CARD, CHECK

75 — RETURN POLICY: 30 DAYS

76 — RATING: 4.2

77 — REVIEWS: CLICK HERE

| PRODUCTS | PRICE | AVAILABILTY |
|---|---|---|
| 10 — COMPUTER A | $1000 | YES — 150 |
| 10 — COMPUTER B | $2000 | NO — 150 |
| 10 — COMPUTER C | $3000 | YES — 150 |

78 (AVAILABILTY), 80 (PRICE)

FIG.7A

SYSTEM AND METHOD FOR RETRIEVING AND NORMALIZING PRODUCT INFORMATION

RELATED APPLICATIONS

This application is a continuation application which claims the priority benefit of U.S. application Ser. No. 13/794,055 which is a continuation application filed on Mar. 11, 2013 that claims the priority benefit of U.S. application Ser. No. 09/730,538 filed on Dec. 7, 2000, which is herein incorporated by reference in its entirety.

BACKGROUND OF THE DISCLOSURE

1. Field of the Disclosure

The present disclosure relates generally to a system and method for collecting and presenting product and vendor information on a distributed network such as the Internet.

2. Background and Related Art

It is known to sell products on a distributed network such as the Internet. Online sales or e-commerce is a rapidly growing segment of the economy. Systems for selling products on a distributed network are sometimes referred to as electronic merchandising systems or virtual storefronts. It is further known to aggregate in one user interface access to multiple online vendors to enable a user to choose among several retailers goods. Sites containing multiple vendors are sometimes referred to as electronic or virtual malls, or shopping agents or "bots." An electronic vendor or electronic mall provides a display that generally includes images and descriptions of merchandise. These sites also generally provide the vendors' prices for the product. Shopping agents or "bots" aggregate product pricing information from multiple vendors on a single site.

In addition to serving as an avenue for commerce, a distributed network allows consumers to access considerable amounts of information about products. For example, consumers can research products by accessing information provided by manufacturers, vendors, distributors, etc. Consumers also may research products through third-party sites, such as ConsumerReports.org®, that publish industry reviews of products.

Consumers may further communicate with each other to exchange product experiences and information. For example, consumers may interact on Usenet discussion groups to share information such as personal experiences with products. In addition, it has been proposed by the assignee of the present disclosure to survey consumers regarding the quality of particular products and/or services and to publish or advertise the results of the survey as numerical ratings. Recently, with the rapid technological advancement of the Internet, it has become further possible for individual consumers to provide narrative reviews of products and/or services, in addition to the standardized scaled ratings.

A consumer can also research information on vendors. For example, vendors typically provide on their websites information such as their shipping, billing and return policies. As with products, consumers also may communicate with other users to exchange experiences and information related to vendors on online discussion groups or at third-party sites that allow users to rate and review vendors. There further exist websites, such as gomez.com and bizrate.com, that allow users to rate vendors.

Although there is an abundance of vendor and product information on the Internet, this information is distributed over numerous websites. To access the information, consumers need to locate these various websites. However, consumers may have difficulties finding the various websites. For instance, searching under a product name on a search engine may locate millions of websites, most of which provide little or no relevant information. Accordingy, there presently exists a need for a methodology to provide a single source for information on products and vendors.

Furthermore, even if a user locates the various websites containing the desired product and vendor information, the large amount of information provided is not organized for easy access by the user. Because there exists so much information, consumers may have difficulty sorting, comparing and using it. Consequently, there further exists a need for a methodology to organize and present product and vendor information for easy access by consumers.

It is generally known to use a database to electronically organize and store information. In the most general sense, a database is a collection of data. Various architectures have been devised to organize data in a computerized database. Typically, a computerized database includes data stored in mass storage devices, such as tape drives, magnetic hard disk drives and optical drives. The three principal database architectures are termed hierarchical, network and relational. A hierarchical database assigns different data types to different levels of the hierarchy, with each record having one owner. In this way, links between data items on one level and data items on a different level are simple and direct. However, a single data item can appear multiple times in a hierarchical database, which creates data redundancy. To eliminate data redundancy, a network database stores data in nodes having direct access to any other node in the database. In the network database, each record has multiple owners, and there is no need to duplicate data since all nodes are universally accessible. Alternatively, in a relational database such as Oracle®, Sybase®, Informix®, Microsoft SQL Server®, Access®, and others, the basic unit of data is a relation that comprises attributes and tuples. The records in a relational database have no owner.

In an implementation of a relational database, a relation corresponds to a table having rows, where each row corresponds to a tuple, and columns, where each column corresponds to an attribute. From a practical standpoint, rows represent records of related data and columns identify individual data elements. A table defining a retailer's product line may, for example, have product names, product numbers (e.g., Stock Keeping Units or SKUs), prices and other product features. Each row of this table holds data for a single product and each column holds a single attribute, such as a product name. The order in which the rows and columns appear in a table has no significance. In a relational database, one can add a new column to a table without having to modify older applications that access other columns in the table. Relational databases thus provide flexibility to accommodate changing needs.

All databases require a consistent structure, termed a schema, to organize and manage the information. In a relational database, the schema is a collection of tables. Similarly, for each table, there is generally one schema to which it belongs. Once the schema is designed, a tool, known as a database management system (DBMS), is used to build the database and to operate on data within the database. The DBMS stores, retrieves and modifies data associated with the database. Lastly, to the extent possible, the DBMS protects data from corruption and unauthorized access.

A human user controls the DBMS by providing a sequence of commands selected from a data sublanguage. The syntax of data sublanguages varies widely, but the American National Standards Institute (ANSI) and the International Organization for Standardization (ISO) have adopted Structured English Query Language (SQL) as a standard data sublanguage for relational databases. SQL comprises a data definition language (DDL), a data manipulation language (DML) and a data control language (DCL). DDL allows users to define a database, to modify its structure and to destroy it. DML provides the tools to enter, modify and extract data from the database. DCL provides tools to protect data from corruption and unauthorized access. Although SQL is standardized, most implementations of the ANSI standard have subtle differences. Nonetheless, the standardization of SQL has greatly increased the utility of relational databases for many applications, including retail sales and merchandising operations.

Although access to relational databases is facilitated by standard data sublanguages, users still must have detailed knowledge of the database's terminology to obtain needed information from a database since one can design many different schemas to represent the storage of a given collection of information. For example, in an electronic merchandising system, a merchant may elect to store product information, such as a product SKU, product name, product description, price and tax code, within a relational database. Another merchant may elect to store a different product SKU, product name, description, price and tax code in a table. In this situation, an SQL query designed to retrieve a product price from one merchant's database is not useful for retrieving the price for the same product in the other merchant's database because the differences in data types require the use of different SQL queries. As a consequence, developers of retail applications accessing product information from relational databases have to adapt their SQL queries to each individual schema. This, in turn, prevents their applications from being used in environments where there are a wide variety of databases having different schemas, such as the World Wide Web.

The rapid development of the World Wide Web (Web) has facilitated the use of online merchant systems. Online merchant systems enable merchants to creatively display and describe their products to a global audience of shoppers using Web pages defined by an output language such as hypertext markup language (HTML). HTML enables merchants to lay out and display content, such as text, pictures, sound and video. Web shoppers access a merchant's page using a browser, such as Microsoft Explorer® or Netscape Navigator®, installed on a client connected to the Web through an online service provider, such as the Microsoft Network® or America OnLine®. The browser interprets the HTML to format and display the merchant's page for the shopper. The online merchant system likewise enables shoppers to browse through a merchant's store to identify products of interest, to obtain specific product information and to electronically purchase products after reviewing product information. Merchants often store product data, such as product descriptions, prices and pictures, in relational databases. Online merchant systems, therefore, have to interface with merchant databases to access and display product information. As each merchant organizes their product information differently, there is a large installed base of databases having a wide variety of data types for product information.

This problem is even greater for websites that seek to advertise and sell products from a variety of online merchant systems. A problem with finding product information on the Internet is that the same product may have numerous names or identifiers depending on the merchant's site on which it is stored. In particular, a product may be identified by its model name, serial number, SKU assigned by the vendor, distributor, part number, etc. Even these identifiers may vary greatly. For example, a product may have numerous model names because the name varies from country to country, the manufacturer may periodically change the product's name, or the manufacturer, consumers and merchants may use numerous different names to refer to the same product. Similarly, different vendors use different SKU numbers. As a result, a user may have great difficulty correlating product information about the same product from different sources.

Much information on products is available on the web. For example, it is well known for vendors to provide information, such as product price, on a website. U.S. Pat. No. 5,740,425 by Povilus, for DATA STRUCTURE AND METHOD FOR PUBLISHING ELECTRONIC AND PRINTED PRODUCT CATALOGS, incorporated herein by reference, provides a data structure and method for creating a product database, which defines classes of product groupings and preferably includes a listing of SKUs that correspond to a product or a component of a product. The product database further includes product information for each associated SKU. Similarly, many manufacturers of products provide online information about their products. The manufacturers may further provide technical support and assistance over the Internet. In addition, many Internet sites provide reviews of products. These sites may have writers that test and review the products. Alternatively, the sites may allow users to place their opinions about a product for other users to view. These consumer-posted reviews provide special insights into products because they reflect actual experiences with the product.

However, because the product information from different sources cannot be viewed together, the utility of this abundance of information is limited.

In a preferred embodiment, the website allows the user to select the product from a list of multiple products. In turn, the website may allow the user to select the list of products from a list of classes of products. Alternatively, the website may allow the user to select desired product features and then create a list of products that possess these features.

In another embodiment, the website may allow the user to add a review or rating of the product. The website may also optionally indicate what information other users have found to be useful.

In another embodiment, the website includes decision guides that suggest a product to the user in response to a user input.

Accordingly, the present disclosure provides a single website to provide and organize the product and vendor information available on a distributed network, such as the Internet.

According to a preferred embodiment, the disclosure provides three principal instrumentalities for collecting, normalizing, associating and presenting data to a user. In order to be able to carry out attribute- or parameter-based searches of a database for products or other data objects (for simplicity, hereinafter the term "product" shall be used generically to mean any data object searchable on a database, such as for example products, services, news items, demographic, historical, scientific or statistical information, financial instrument or securities information, real estate information, and the like), consistent terminology and ontology must exist in the database. Additionally, in order to avoid having "orphaned" or non-related items of data present in the database, it is desirable to provide the capability of associating such items of data with other, similar products, based on shared attributes. Thirdly, it is desirable to reduce the time required to complete a parameter-based product search of a database.

BRIEF DESCRIPTION OF THE DRAWINGS

The disclosure will be described in detail with reference to the following drawings in which:

FIG. 2 is a table for translating or normalizing diverse product identifiers to the same products to which they are referring;

FIG. 3 is a table associating core product identifiers with corresponding domains and attributes;

FIGS. 6, 7A-7C, 8 and 9 are examples of displays of information obtained as a result of the method of FIG. 1.

DETAILED DESCRIPTION OF PREFERRED EMBODIMENTS

Figure 1:
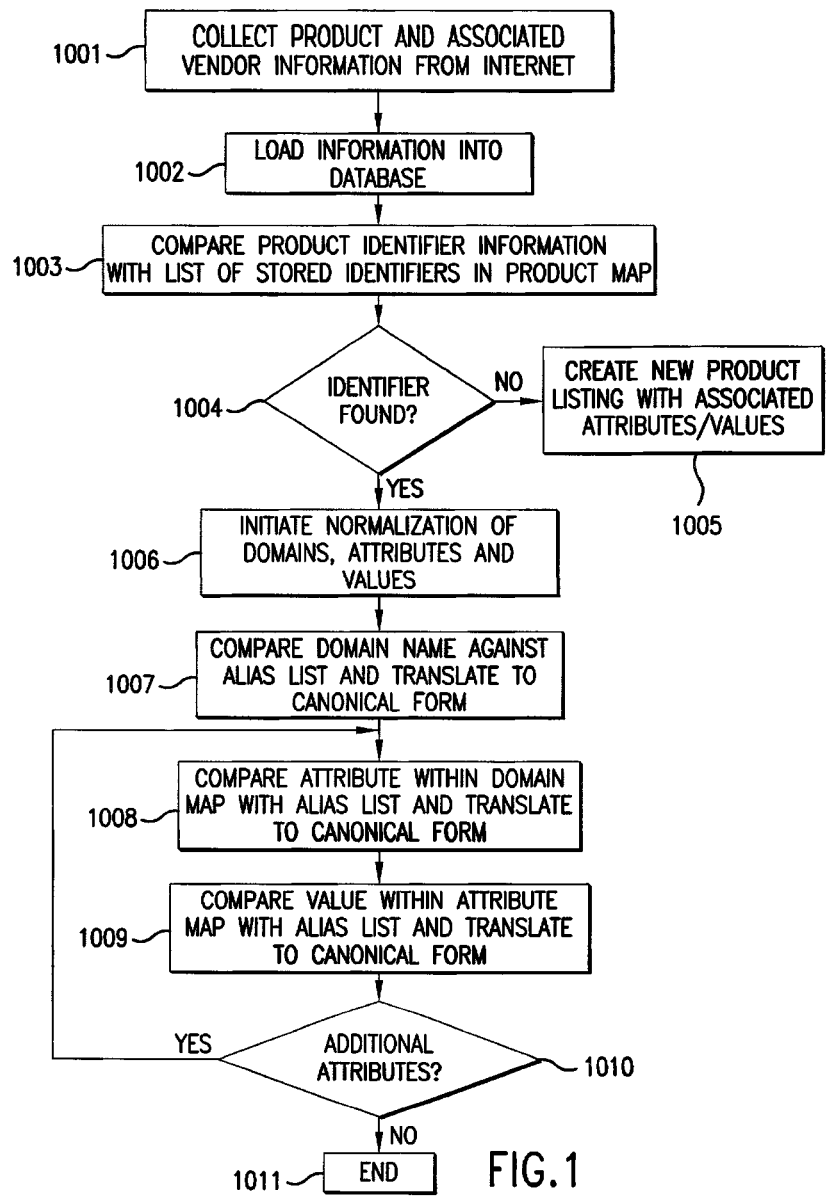
FIG. 1 is a flowchart illustrating a method for normalizing and associating gathered product information into a database in accordance with an embodiment of the present disclosure.

In one aspect of the present disclosure, a method is provided for the collection and storage of product information in a database from which it can be quickly and efficiently searched by a user and the results displayed. As illustrated in FIG. 1, the first step 1001 of the method is the collection of product information and associated vendor information from the Internet or from other sources.

The collecting of product and vendor information can be carried out in a variety of ways. Some of the information may already reside at a website server in association with other applications and functions. For example, a vendor's site will already contain data relating to the vendor and the products sold by the vendor. This data may be retrieved by using known "scraper" technology and loaded into a database at step 1002. The data may be subsequently combined with additional information collected from other sources.

For example, the additional information may be collected manually by a human operator at step 1001 who examines various sources such as third-party websites, publications, brochures, manufacturer specification sheets, vendor advertisements, etc., for pertinent data. The human operator at step 1002 then loads this information into an information storage device such as a database contained on a server. For example, the operator may examine and record the inventory and pricing information displayed on a vendor's website.

Alternatively, information may be collected directly from a server controlling the third-party information source. For instance, a vendor may sell or provide a list of its inventory and the prices for the products in the inventory in electronic form. The list then may be transferred directly from the third-party server to the information storage device.

As mentioned above, the information also may be obtained automatically through the use of programs that search for desired information on a distributed network such as the Internet. Scraper programs automatically examine third-party websites and create an output forwarding desired contents of the website to the information storage device. For example, a scraper program can be designed to search the website of a vendor for the prices of products sold by the vendor. The scraper may run either in real time, upon a request by the user, or in batch mode so that the vendor's prices are periodically examined and stored, such as on a weekly basis. Generally, there is a different scraper program for each type of information from each information source. In this way, a scraper can be designed specifically to locate desired information on the third-party website and to interpret the format of this information.

The scrapers preferably create an output using Extensible Markup Language ("XML") to return information from the third-party site in a usable format. XML is a web language similar to the standard hypertext markup language ("HTML"), but the XML rules are more complex to allow more varied uses. In particular, XML is more interactive and better suited for electronic commerce because the coding contains markers the simplify the standardization of information over the Internet. This feature allows the use of intelligent agents that seek out consistent information and then act on what they find. Furthermore, the parsers in XML can be small and fast and can read complex hierarchical structures.

The information may be gathered through a combination of all the above methods in order to gather the information in the most efficient manner.

As the information is gathered, it is deposited into a storage device such as a database on a server for storage and easy future access. It is well known to use databases to store and organize data. For instance, the following example shows a database containing information on two vendors that sell the same product.

Example 1

| Vendor's Name | Price for product | Availability | Vendor Rating | Profile |
|---|---|---|---|---|
| A | $1 | Yes | 4.5 | A.doc |
| B | $2 | No | 4.3 | B.doc |

In this example, the same product is sold at Vendor A and Vendor B. Vendor A charges $1 for the product, has the product in stock, and has a vendor rating of 4.5. The database further indicates that a profile for Vendor A is stored in the file, A.doc. Similarly, Vendor B sells the product for $2, does not have the product in stock, has a vendor rating of 4.3, and has a profile stored in the file B.doc.

The information collected will typically contain one or more product identifiers, such as a UPC, a manufacturer model number, a distributor part number, a vendor-specific SKU, etc. The information will further include data such as the product name, type of product (domain), and various attributes of the product with specific values for each listed attribute.

In order to have the ability to perform a parameterized or even accurate search on such information, it is necessary to have consistent and normalized data in the database. For example, a search for "XGA" will not retrieve as a "hit" data for a laptop computer in which screen size is specified as "1024.times.768," even though these two terms refer to the identical type of display. Accordingly, the present disclosure provides a normalization engine that translates or normalizes a list of attributes and values describing an object (product) into a list containing a canonical representation for each attribute and value, in addition to a canonical domain describing the product in general (such as "notebook" to describe a portable computer, which also may be identified as a "laptop" computer). For example, the domain "laptop" would be normalized to refer to the domain "notebook," where "notebook" would be selected by the data entry operator as the canonical representation. Similarly, attribute/value pairs, such as "screen_size-xga" would be normalized to "display res=1024.times.768."

This is carried out by maintaining a list of aliases or translations for canonical domains, attributes and values in the database. Each known alias for a canonical domain term, attribute term, and value term is listed in the alias list in the database with a corresponding entry identifying the canonical representation into which the alias will be translated as the object or product information is being loaded into the database. An operator may add entries by detecting new synonyms for a canonical term in an object file and indicating the canonical term for the detected synonym. All existing occurrences of the synonym term in the database are then translated into the indicated canonical term, and the synonym is then added to the alias list, such that subsequent data entries containing that synonym will thereafter automatically be translated into the canonical representation for entry into the database.

Before the loaded information at step 1002 can be assimilated into the database, it is first determined at step 1003 whether the information pertains to an existing product already stored in the database. If so, the new information is merged into the listings for the existing product. In case of a conflict with pre-existing information for the product, a choice may be made as to which information should take precedence. If the new information can be confirmed as corresponding to updated information with respect to the stored information, then the new information may be written in place of the pre-existing information in the database. Otherwise, the pre-existing information can be selected to take precedence over the newly loaded information, FIG. 2 shows a product map or table 2000 containing a list of known product identifiers 2001, and their corresponding core product identifier 2002. The core product identifier can be an arbitrary integer selected by the operator to identify a particular product, which may be known by various identifiers, as mentioned above. In the example, both product id #2 and product id #N refer to the same core product, as indicated by the same core product identifier, 790, contained in the map.

At step 1004 it is determined whether or not the product identifier contained in the new information is found in the product map 2000. If not, at step 1005 a new product listing is created in the database with the associated attribute/value pairs for the product. When a new domain, attribute or value is added to the database it is marked as "new." New data items will not be displayed as part of a search result until an editor or operator has reviewed them to determine their appropriate display representation, sorting order, and whether or not they can be identified as aliases for pre-existing information in the database.

If the identifier is found, at step 1006 normalization of the domains, attributes and values is initiated. It is noted that translations are performed in a product-specific manner; thus, the attribute alias list for the attribute "display_res" for a laptop does not apply to a PDA device or a desktop PC. Similarly, the value alias list for the value "1024.times.768" for a laptop would be specific to the attribute "display_res" within the laptop domain and would not apply to a value for an attribute. Thus, at step 1007 the domain name of the object is compared against a domain alias list, and translated into its canonical representation as indicated in the alias list. Once the canonical domain name is obtained, each of the attributes is compared with the alias list of attributes associated with the canonical domain name map at step 1008, and each value of the attribute/value pair is then compared with the canonical attribute map at step 1009. At step 1010 it is determined whether additional attribute/value pairs exist in the new information that need to be normalized. If so, the process returns to step 1008. If not, the process ends at step 1011. Alternatively, all of the attributes can be translated together at step 1008, and then all of the values associated with each attribute can be translated together at step 1009.

According to the disclosure, all information in the entire database can be updated to normalize data already in the database in real time as the aliases are added to the database, by maintaining the translation rules together with the data set in the database. Additionally, the normalization process enables all attribute information to be normalized to a common unit base (e.g., normalizing all units of length into millimeters, etc.).

An example of such a domain map 3000 is shown in FIG. 3. Each core product identifier 3001 has a canonical domain 3002, which in turn is associated with a number of canonical attributes 3003, 3004, 3005. For each of the attributes an alias list is maintained containing all known aliases for the canonical attribute. The same applies to values for each attribute. The values are sorted in numerical order where possible; for values which are not simple numbers, the sorting order can be defined by the operator on apex attribute basis. By identifying the same attribute values as pointing to the same product, it is possible to effect product and domain merges in the database automatically by defining a threshold overlap level by which attributes for separate product records in the database are the same. Once the two or more) separately stored product records have been identified as pertaining to the same product, the records can be merged into a single record in the database containing all of the product attributes in one location.

The domain editor is a Java application user interface used to manipulate data in the database, such as setting the display characteristics for the domain and attribute strings, allowing the operator to translate and normalize attribute and value information, editing of data values, merging attributes, and merging domains. By setting a threshold level of overlap, the normalization engine can automatically suggest to a user possible domain merges or product merges.

Further, if the product information contains multiple identifiers, each of the identifiers can be compared with the stored product identifiers, and any new identifiers may be added to the map as being associated with or mapped to the canonical representation found for at least one of the identifiers. This can be done since it is known that all the identifiers pertain to the same product, as they were bundled together in the information collected. In this way, the database can be made to "learn" new product aliases as more and more information is loaded into it, thereby associating more and more of the information stored in the database as information is added.

An association engine makes it possible to associate previously orphaned pieces of data with product records, as more aliases are added and associations made in the database.

Figure 10:
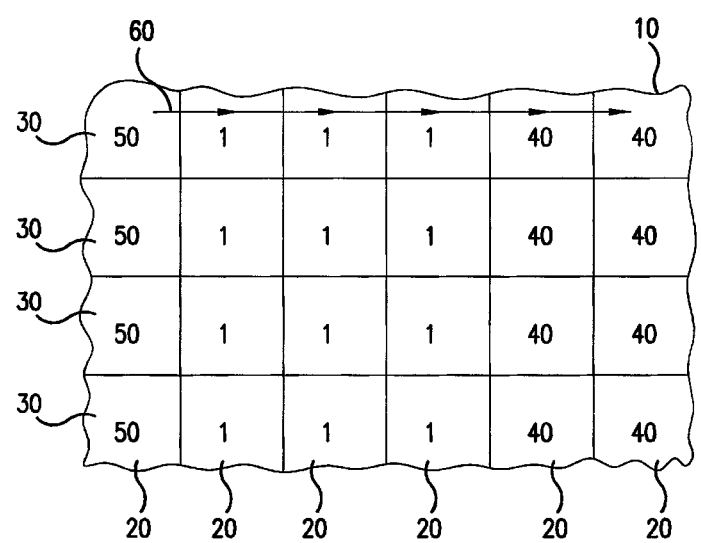
FIG. 10 illustrates a name database, according to an embodiment.

As illustrated in FIG. 10, the present disclosure provides a name database 10 containing data locations 1 for storing multiple different identifiers for each of a number of products. The name database 10 may be an array with columns 20 that represent product attributes, and rows 30 that represent the different identifiers for each attribute. The name database 10 is further characterized by an indication of the relationships between the different identifiers in separate classes. For example, FIG. 10 illustrates arrows 60 that link the different existing identifiers for a similar product. The direction of the arrow 60 in FIG. 10 shows a horizontal pattern used for hierarchical databases. However, arrow 60 may travel in any direction, in accordance with the possible relationships among the data in the name database 10.

An illustrative example is provided below:

Example 1

A Name Database, Linking to Information Found at Several Different Sources

1A: Manufacturer's Database

| MODEL | COLOR |
|---|---|
| r | RED |
| b | BLUE |

1B: Vendor 1 Database

| SKU 1 | COST |
|---|---|
| 10 | $2 |

1C: Vendor 2 Database

| SKU 2 | COST |
|---|---|
| 100 | $3 |

1D: Naming Database

| MODEL | SKU 1 | SKU 2 |
|---|---|---|
| r | 10 | |
| b | | 100 |

In this example, the manufacturer produces two models, model r that is red and model b that is blue. However, the manufacturer does not provide information on the prices of the models. Vendor 1 sells a model with a SKU of 10 for $2 and Vendor 2 sells a model with a SKU of 100 tier $3. However, neither Vendor 1 nor Vendor 2 indicates which model corresponds to the SKU employed by the vendor. Only through accessing the naming database can a consumer recognize that Vendor 1 sells model r and Vendor 2 sells model b. In this way, the naming database serves as a modern Rosetta stone to associate the proprietary nomenclature from one source of product information with another source.

In the embodiment demonstrated in Example 1, the name database includes no information on the products, but instead only provides the identifiers and their interrelationships. It should be appreciated however, that the naming database could also include product information, as seen in the following example.

EXAMPLE 2: PRODUCT NAMES AND PRODUCT INFORMATION ARE ON THE SAME DATABASE

| MODEL | SKU 1 | SKU 2 | COLOR | COST |
|---|---|---|---|---|
| r | 10 | | RED | $2 |
| b | | 100 | YELLOW | $3 |
| g | 20 | 200 | GREEN | $3 |

In this example, the name database has combined the databases of Example 1, and information on a new model g is provided. As a result, the illustrated hierarchical database provides all known information on models r, b, and g. New model g, as indicated in the database, has a green color, costs $3 and is available as SKU 20 at vendor 1 and as SKU 200 at vendor 2. In this example, new types of information are added to the database as additional columns and additional products are added as new rows. In this example, as well as in Example 1, the relationships between the product identifiers are defined by the rows 30 and columns 20. In particular, different identifiers for the same product appear in the same row 30, and identifiers for different products from the same source appear in the same column 40.

In addition, FIG. 10 illustrates product information columns 40 in the name database 10. As described above, the product information database 10 may include virtually any type of data related to the product. For example, the product information columns 40 may contain links to third party reviews of the particular product or to an Internet discussion regarding the product. Conversely, the product information may provide information on similar, competing products or indicate possible vendors for purchase to the product. The product information may further include related advertisements or pictures of the product.

As seen in the Cost column of Example 2, data entries may be redundant in a hierarchical base. To address this concern, the present disclosure preferably uses a relational database, as illustrated in the following example.

EXAMPLE 3: RELATIONAL NAME DATABASE OF THE INFORMATION IN EXAMPLE 2

| | MODEL | SKU 1 | SKU 2 | COLOR | COST |
|---|---|---|---|---|---|
| 1 | r | 10 | 100 | RED | $2 |
| 2 | b | 20 | 200 | YELLOW | $3 |
| 3 | g | | | GREEN | |

With this relational database, a vector in the form of [model, SKU 1, SKU 2, color, cost] shows the relative relationship between the data in each column, rather than merely looking horizontally. In this example, the relationship vectors are [1, 1, 0, 1, 1], [2, 0, 1, 2, 2], and [3, 2, 2, 3, 2]. In other words, [1, 1, 0, 1, 1], corresponds to the first model (r), which has the first listed value of SKU 1(10), no value of SKU 2, the first listed color (red) and the first listed cost ($2).

It should be appreciated that other database formations are possible and are well known in the field. The database structures illustrated in FIG. 1 and the above examples may be easily modified to form different structures that perform the same function. For example, the name database 10 may be restructured so that new rows contain new data types and new columns contain additional members of known data types. Similarly, the name database 10 may be multi-dimensioned. For instance, the name database 10 may have three dimensions: one to store the different products; a second to store the different names for the same product; and a third to store the various data about the product.

In one embodiment, name database 10 assigns a universal SKU 50 to every product. The universal SKU 50 may be, for example, an alphanumeric code. In this way, the name database 10 has a system fir labeling the various products, which does not have to be altered as changes are made to the identifiers for the product. In another embodiment, the name database 10 is formed using SQL to permit easy additions and changes to the name database 10.

In order to make use of the normalized and associated information that is stored in the database, it must be capable of being queried by clients and presented or displayed in a readily understandable format. Queries against a standard relational database unfortunately do not perform satisfactorily to accommodate a large number of simultaneous clients (as is typically experienced by a website server), or to present a sophisticated user interface or display, even for a small number of users. Consequently, according to another aspect of the present disclosure a product information server is provided which enables the information to be traversed and compared with query terms quickly.

According to this aspect of the disclosure, the object information is compiled into a compact, flat file format. The compact file format takes each character string for each piece of information and "tokenizes" it by assigning to it a unique integer. Although it is possible that the token may be arbitrarily chosen, according to the preferred embodiment of the disclosure the value of the integer assigned to the character string is equal to the offset of the location of the string in the data block. In this way, each token points to the beginning of its corresponding character string in the block. Consequently, the server is able to go immediately to the location of the start of the character string in the block based on the value of the token, so as to retrieve the string for display.

Figure 4A:
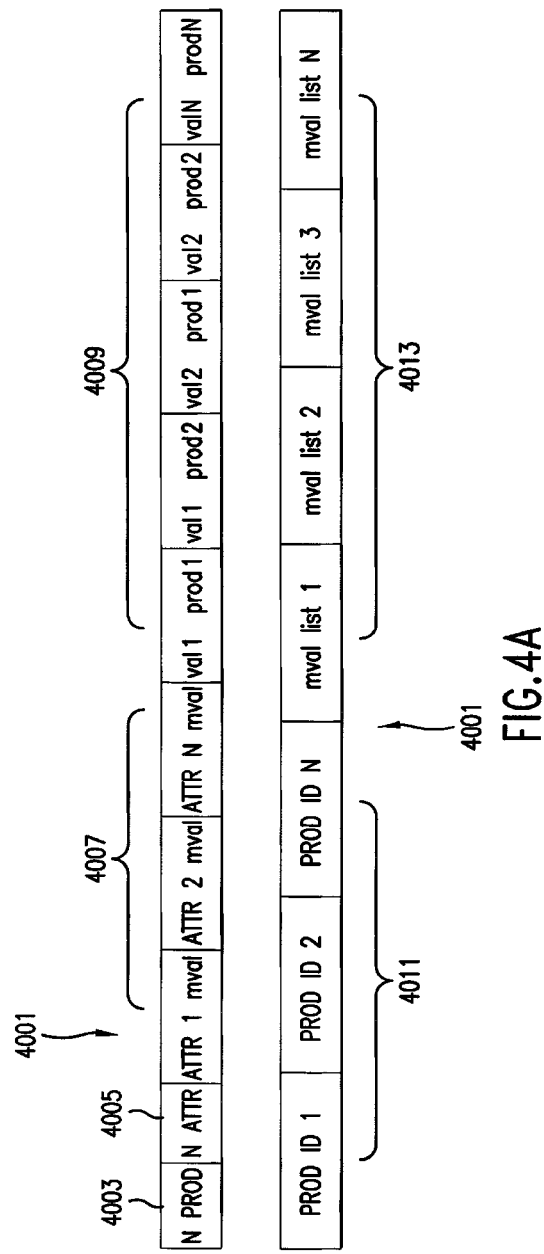
FIG. 4A is a database file format showing the arrangement of product information for retrieval.
Figure 4B:
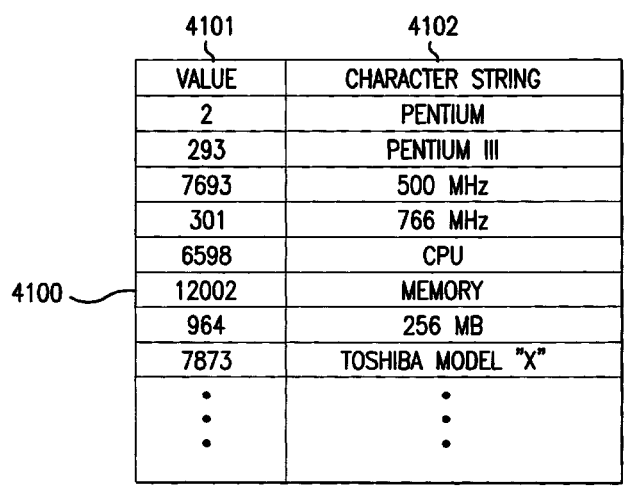
FIG. 4B is a character string took up table associating a multiplicity of character strings with unique integers.

The character strings and unique integer values are placed in a look-up table 4100 as shown in FIG. 4B. Each character string is stored in a field 4102 which is associated with a unique integer value field 4101. In the example, the integer 2 identifies the character string "Pentium®", while the character string "CPU" is identified by integer 6598. Each of the tokens representing each product in the database is then written into a file 4001 having a format as shown in FIG. 4A.

Conventionally, information to be presented to a user in a table format is arranged in a file in product sequence order, with each product name being followed by all of the attribute data associated with the product. When organized into a table format, each row represents a specific product, each column represents a specific attribute of the product, and each intersection of row and column contains a token for a character string corresponding to the attribute value. Such a file is sometimes referred to as being in "row major" format. When carrying out a parameter search on such a file, a great deal of irrelevant information is retrieved from the database (usually on a hard disk) and placed into memory. This has the double negative effect of using up the memory resources of the system and making the search take longer because of the need to scan through irrelevant information. For example, if a search is desired for laptop computers having a minimum amount of memory, according to the conventional database file format all attribute information is retrieved for all laptop products, in addition to the attribute search term specified. Thus, the search requires a substantial amount of time because all the irrelevant attribute information pertaining to each product in the database must be traversed in the course of identifying the pertinent attribute information specified by the user.

According to the disclosure, instead of arranging information in "row major" format, the product information server extracts the information from the native database and organizes it in "column major" format, wherein all attribute values of like attributes are arranged in sequence adjacent to each other. For example, all monitor display sizes are arranged next to each other, then all display resolutions arranged next to each other, then all hard disk sizes are arranged next to each other, then all processor clock speeds are arranged next to each other, etc. In this way, an attribute-based search may be performed much faster, by allowing the search to jump immediately to the start of the location of the relevant attribute specified by the user, and to retrieve all the relevant attribute information and only the relevant attribute information into memory to perform the search.

As shown in FIG. 4A, N PROD 4003 is an integer identifying the number of products in the file, N ATTR 4005 is an integer identifying the number N of attributes in the file. Each of the N attributes is represented by an attribute value integer "ATTR I mval" 4007. The integer 4007 identifies the attribute. Each of the values in turn are identified by the "val I prod I" integers 4009. Additionally, an attribute may be multivalued, such that the integers 4007 would correspond to an offset for an "mval list I" 4013, which is an n-tuple, each of the n integers in the n-tuple pointing to a separate value of the attribute in the look-up table.

In a query, the file 4001 is traversed and corresponding integers are retrieved. The associated character strings are then obtained from the look-up table 4100 and are appropriately formatted for display at the client.

Figure 5:
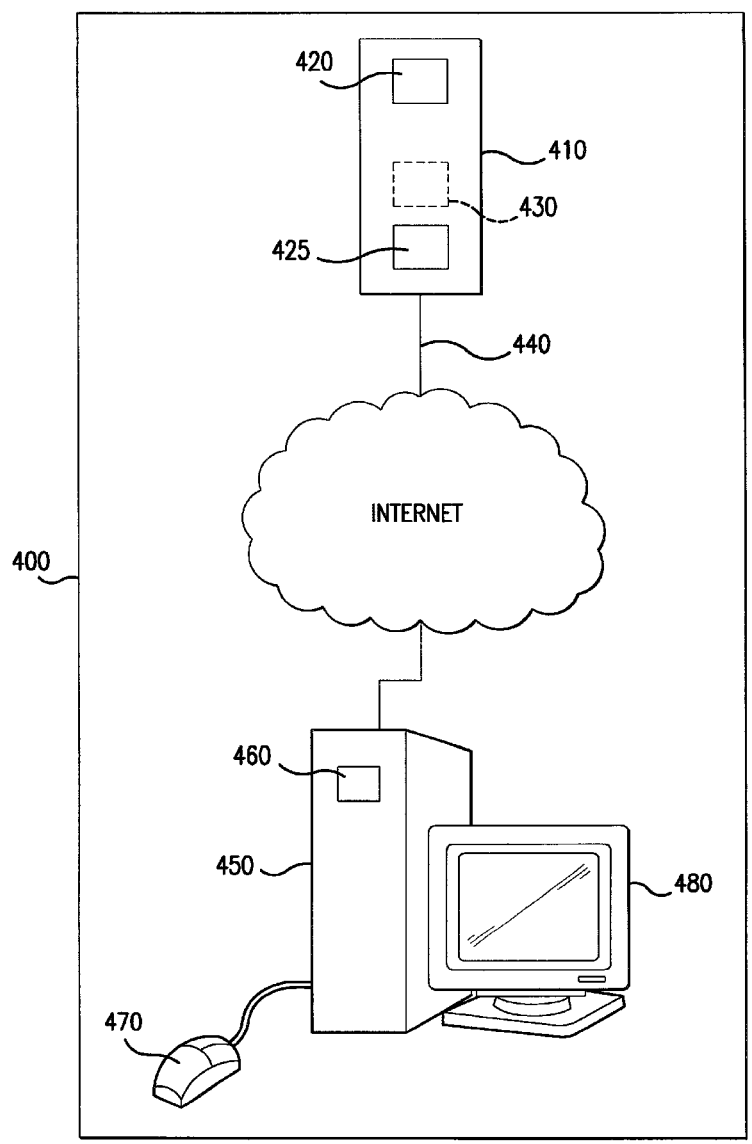
FIG. 5 is a schematic diagram of a system for collecting, storing, and outputting product information in accordance with an embodiment of the present disclosure.

As shown in FIG. 5, the present disclosure provides a system 400 to implement the method of the disclosure to achieve the desired information display. In particular, system 400 comprises a server 410 that contains a storage device 420 for storing the desired vendor and product information. The server also contains a database engine 425 that adds collected information data to the storage device 420 and creates an output using the information stored in the storage device 420.

The system 400 further includes a user's processing device 450, such as a personal computer, and a connection 440 to allow the transfer of information between the server 410 and the processing device 450. The processing device 450 includes a web browser 460 which provides an output to a display device 480, such as a display monitor, and which accepts an input from an input device 470, such as a keyboard or mouse.

In addition to the storage device 420, the server 410 also optionally contains scraper programs 430 for the collection of data, as previously described.

The connection 440 is preferably a distributed network, such as the Internet, to allow a plurality of users to have simultaneous connection to the server.

Figure 6:
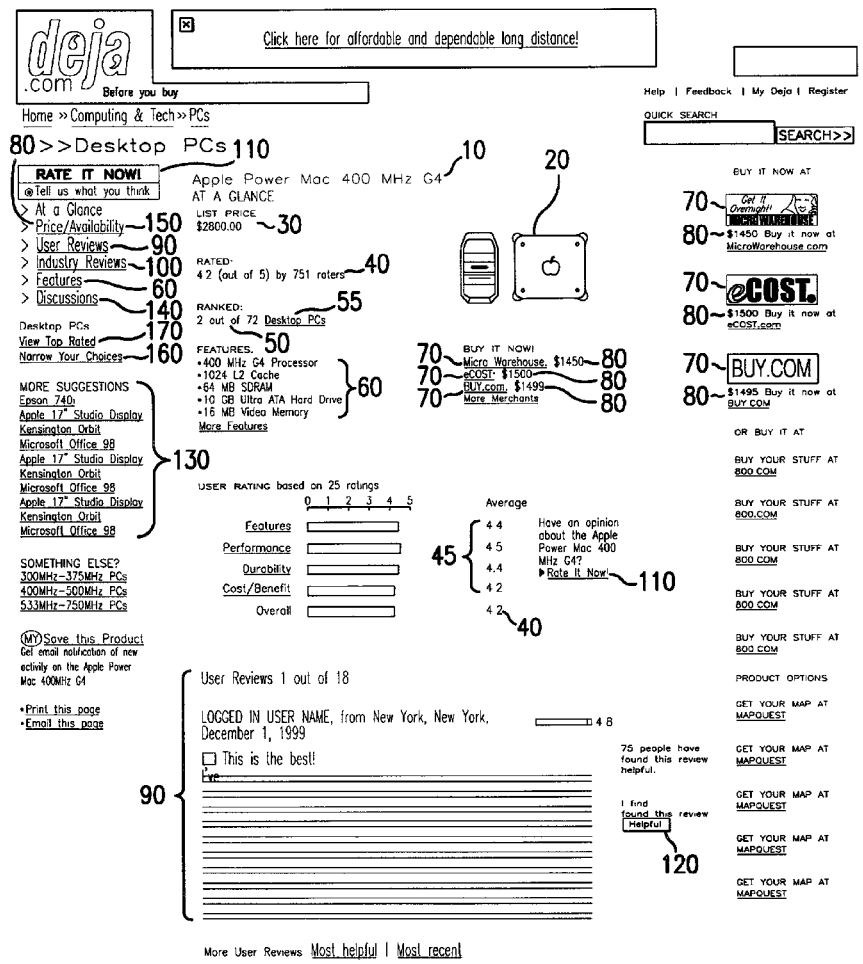

FIG. 6 illustrates a screen shot of a website containing information on a product specified by a user as being of interest and vendors that sell that product. The website displays a name 10 for the product, a list price 30, a composite user rating 40 based upon user ratings 45 in various categories 46, a ranking 50 of the product in a class 55 of similar products, features 60 of the product, vendors 70 who sell the product, a price 80 for the product at each of the vendors' sites, user reviews 90, and access to industry reviews 100.

The name 10 is generally the manufacturer and model name but may be any identifier used for the product. The name 10 may be carried over from a third-party site or arbitrarily created at the website.

Similarly, the list price 30 is a number either given by the product's manufacturer or distributor or arbitrarily assigned by the website. The list price 30 alerts a user to the relative value of the product to allow better evaluation of the prices 80 offered by the vendors 70. For instance, a computer selling for $500 is generally a good value if its list price is $1000, but not if the list price is $100. While the list price is generally higher than the actual price offered 80 by the vendors, this is not necessarily true, especially with rare, collectable items that may sell for much more than the list price.

The consumer product rating is formed, as described above, by surveying a plurality of users and combining these ratings.

As illustrated in FIG. 6, some of the vendors 70 may be identified prominently, so as to encourage the user to patronize these vendors. As further illustrated in FIG. 6, the website may optionally display any of the following: an image 20 of the product; a rate-it-now display 110 to allow the user to add a user review 90 and rating 40 of the product; a helpfulness evaluation 120 of the information; complementary products 130 that may be purchased along with the desired product; or a discussion link 140 to Usenet and/or other discussion areas regarding the product and/or related products.

Because of limitations on the size of the display, the website may not all display of the product and vendor information at the same time. The information is then nested, and the consumer may access this information by performing an action such as clicking a pointing device (mouse) over one of the displayed Objects. For example, to find more information about one of the vendors 70, the user selects the vendor to be redirected to a sub-page, as shown in FIG. 7A. The sub-page then provides more specific information for the vendor 70, such as the vendor's address 71; telephone number 72; shipping practices 73; payment policy 74; return policy 75; a rating of the vendor 76; reviews of the vendor 77; and an indication 78 of the product name 10, product prices 80, and availability 150.

Figure 7B:
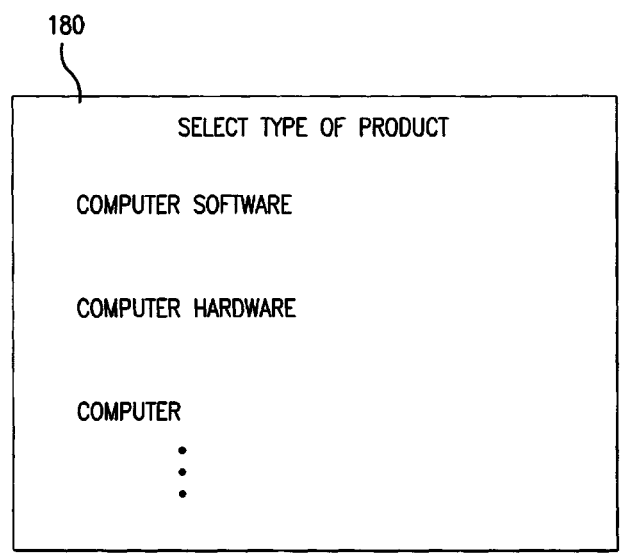
Figure 7C:
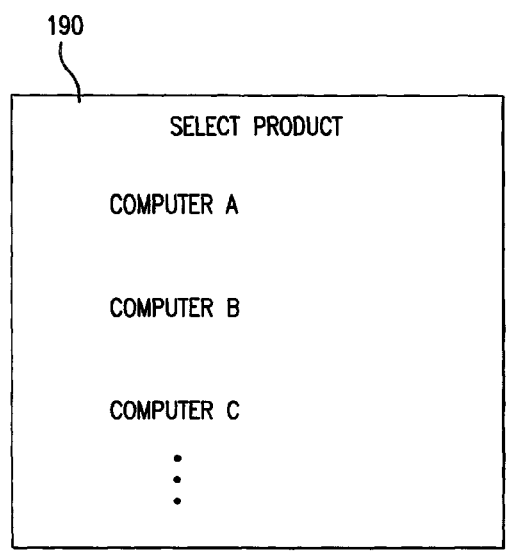

The website may allow the user to select a product by reviewing a list of product categories 180, as illustrated in FIG. 7B. One the user selects a category of products, the user may then select a particular product from a product list 190 from that class, as shown in FIG. 7C. Alternatively, the product list 190 may be formed by displaying the highest rated products 170.

Figure 8:
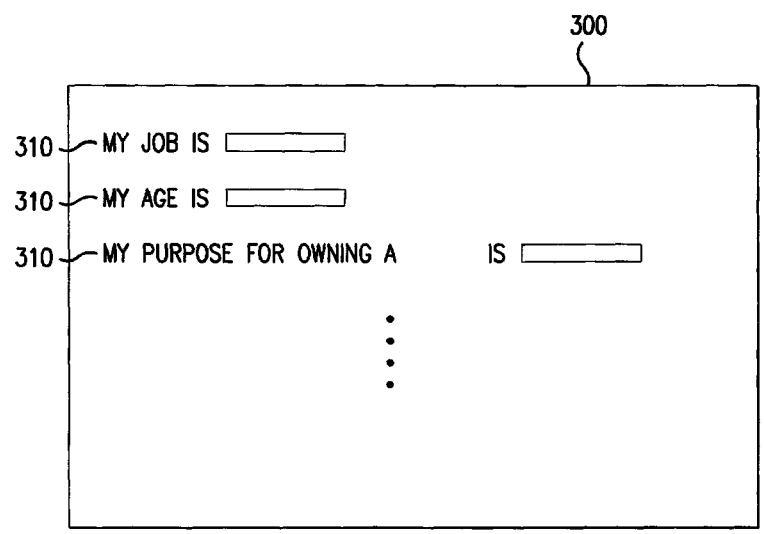

As illustrated in FIG. 8, the website may further contain a decision guide 300 which asks the user general questions 310 such as the user's age, occupation, and hobbies. The decision guide then uses this information to select a product for the user. This feature is helpful for a user who may not have sufficient technical knowledge to select a product based upon the features of that product. In this way, the product list 190 is formed to meet the specific needs of the user.

Figure 9:
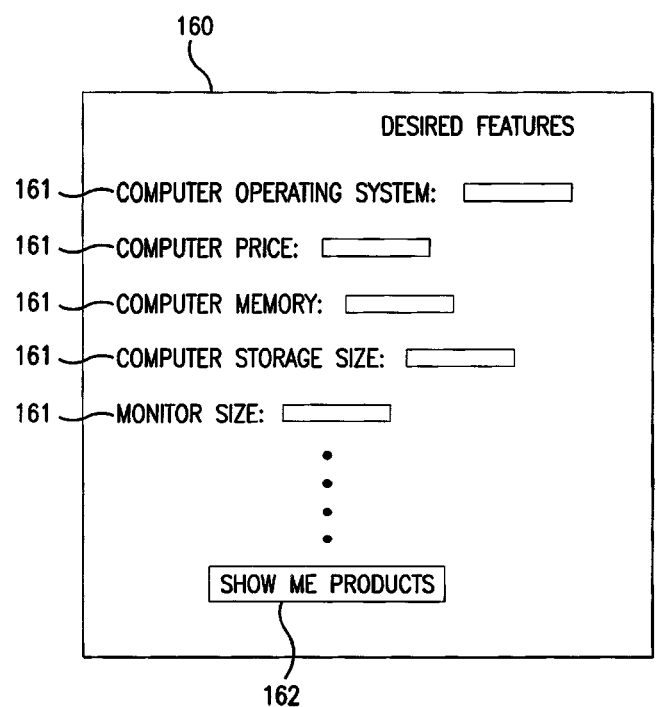

For a user who understands the product features, the website may assist the user in identifying products containing user-desired features. A narrow-your-choices option 160 of FIG. 6 redirects the user to a display, such as illustrated in FIG. 9. The narrow-your-choices option 160 asks the user to specify or select one or more feature options 161 for the product of interest. After the user has selected the desired feature options 161, the user sends a "display products" instruction 162 to the website to display the products meeting the chosen feature options 161. In this way, the product list 190 can be formed with products having the desired features.

The disclosure thus having been described, it will be apparent to those skilled in the art that the same may be varied in many ways without departing from the spirit and scope of the disclosure. Any and all such modifications are intended to be included within the scope of the following claims.

We claim:

1. A system, comprising:
a data collector, implemented by one or more processors, that is configured to collect product information from a plurality of suppliers, the product information relates to a product that is described differently by two or more of the plurality of suppliers; and
a normalization engine that is configured to provide a normalized representation of the product.

2. The system of claim 1, wherein the normalization engine provides a normalized attribute-value pair.

3. The system of claim 1, wherein the normalization engine provides a normalized description of a product type.

4. The system of claim 1, wherein the data collector is further configured to scrape sites associated with the two or more suppliers.

5. The system of claim 1, wherein the data collector is further configured to store the product information in a database and identify the product as already described in the database.

6. The system of claim 1, wherein the product information includes a stock keeping unit.

7. The system of claim 1, wherein the normalized representation of the product includes a canonical representation of a plurality of domains.

8. The system of claim 1, wherein the normalized representation of the product includes a canonical representation of a plurality of values.

9. The system of claim 1, wherein the normalized representation of the product includes a canonical representation of a plurality of attributes.

10. A method, comprising:
collecting, by a computer system, product information from a plurality of suppliers, the product information relating to a product that is being described differently by two or more of the plurality of suppliers, the collecting being performed by at least one processor; and
providing a normalized representation of the product.

11. The method of claim 10, wherein the providing the normalized representation of the product includes providing a normalized attribute-value pair.

12. The method of claim 10, wherein the providing the normalized representation of the product includes providing a normalized description of a product type.

13. The method of claim 10, wherein the collecting the product information from a plurality of suppliers includes scraping sites associated with the two or more suppliers.

14. The method of claim 10, further comprising storing the product information in a database and identifying the product as already being described in the database.

15. The method of claim 10, wherein the product information includes a stock keeping unit.

16. The method of claim 10, wherein the normalized representation of the product includes a canonical representation of a plurality of domains.

17. The method of claim 10, wherein the normalized representation of the product includes a canonical representation of a plurality of values.

18. The method of claim 10, wherein the normalized representation of the product includes a canonical representation of a plurality of attributes.

19. One or more machine-readable hardware storage devices storing a set of instructions that, when executed by a machine, cause the machine to perform operations comprising:
collecting, by a computer system, product information from a plurality of suppliers, the product information relating to a product that is described differently by two or more of the plurality of suppliers; and
providing a normalized representation of the product.

20. The one or more machine-readable hardware storage devices of claim 19, wherein the normalized representation of the product includes a canonical representation of a plurality of attributes.

* * * * *